Patented Sept. 28, 1937

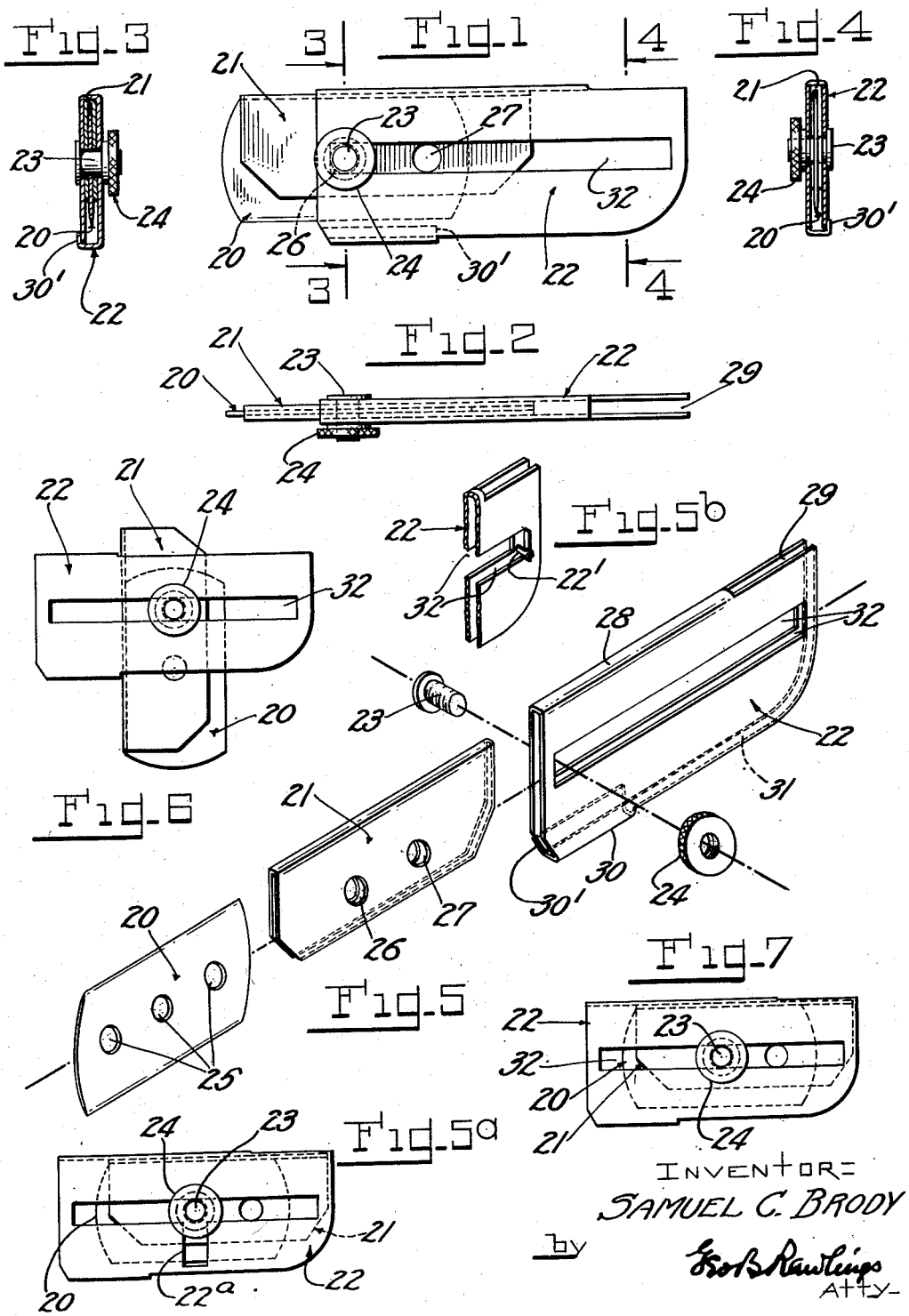
Sept. 28, 1937.   S. C. BRODY   2,094,260
CUTTING DEVICE
Filed July 18, 1936   2 Sheets-Sheet 1
INVENTOR=
SAMUEL C. BRODY
by
Geo B Rawlings
Atty.

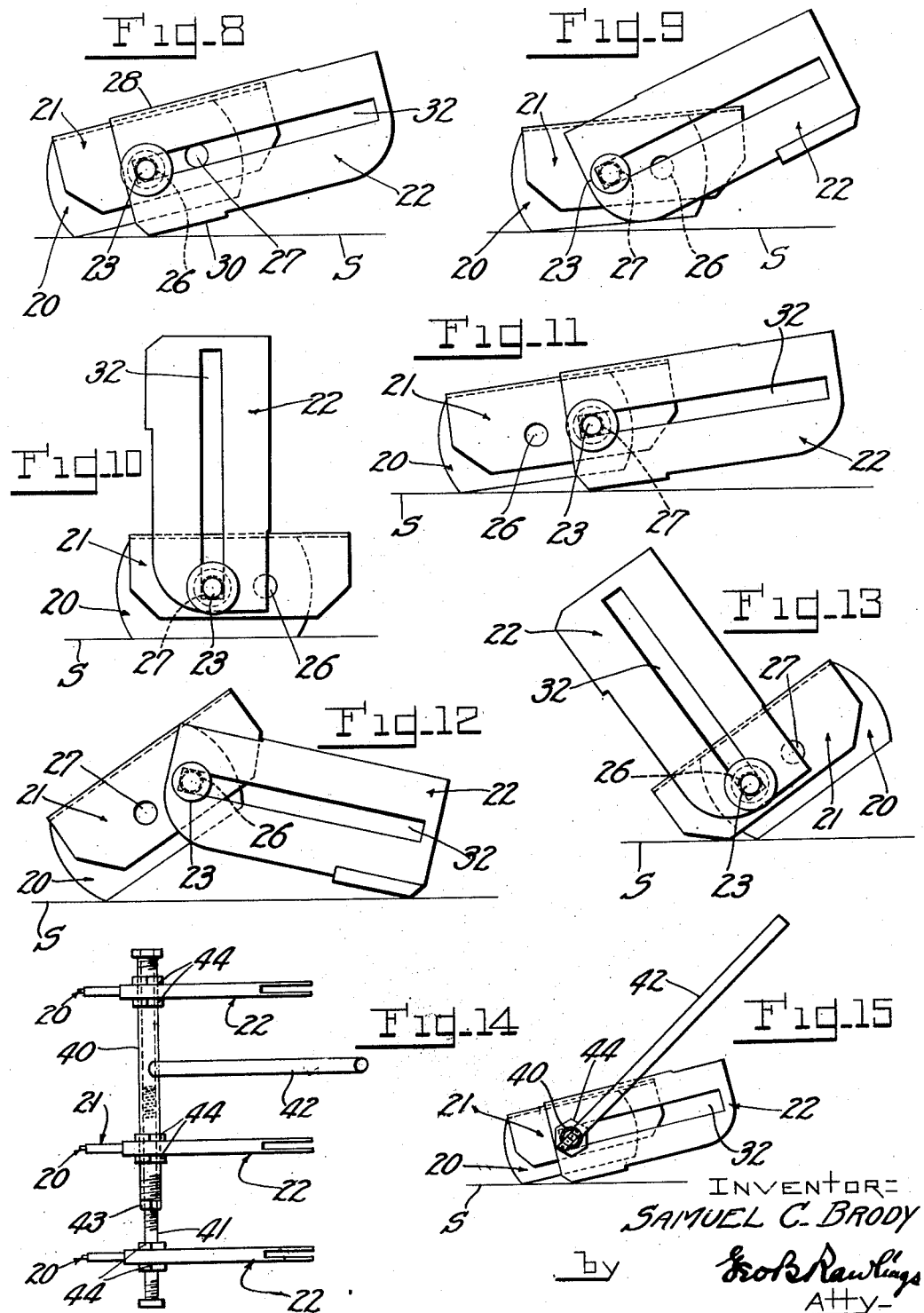

2,094,260

UNITED STATES PATENT OFFICE 2,094,260

CUTTING DEVICE

Samuel C. Brody, Brighton, Mass.

Application July 18, 1936, Serial No. 91,368

11 Claims. (Cl. 30—162)

This invention relates to cutting implements, and particularly to a cutting implement employing a safety razor blade or the like as the cutter element. It will be understood of course that my invention is not restricted to the use of any particular kind of cutter blade. It will also be understood that my invention is not restricted to an implement wherein a single blade only is used, but may be embodied in an implement of the gang or multiple type embodying a plurality of adjustable, detachable and renewable cutting units.

In general, my invention contemplates a cutting implement which when not in use can be telescoped and/or collapsed and carried in a vest or other pocket with all edges of the cutter blade protected and concealed so as to avoid all danger of accident, but which blade by simple and easy manipulation involving only the loosening of a holding screw or its equivalent, can be projected into and locked at any of a wide variety of different cutting angles or positions, and can be removed for purposes of replacement or resharpening when necessary or desirable.

According to my invention, I provide a cutting implement which will permit various selected cutting edges of the blade, or selected portions of any selected cutting edge, to be used as desired, depending upon the adjustment of the blade, the adjustment of the holder, or any selected portion of any selected blade edge, from one cutting position to another, and the locking of the blade in its new position being instantaneous.

Other important advantages of my cutting implement are that such implement may be manufactured and sold at an extremely low cost; that the blade may be instantly and easily adjusted from any of its numerous cutting positions to its sheathed or protected position or vice versa; and that in whatever cutting position the blade is adjusted the cutting action is clean, reliable, and positive.

Where used as a gang or multiple cutter, my invention provides a construction wherein the individual cutting units may be readily adjusted to simultaneously produce as desired, either parallel or non-parallel slits or cuts at desired adjustments and/or different distances from each other.

These, and other features of advantage which will be more fully set forth hereinafter, are attained in the device of the present invention which fulfills a long-felt commercial need for a device of this type.

In the accompanying drawings I have illustrated several embodiments of my invention which I have found satisfactory in actual use and well adapted to the requirements of low cost commercial manufacture.

In the drawings:—

Fig. 1 is a front elevation of a cutting implement in accordance with my invention and showing the cutter blade partially projected from the combination handle and sheath member.

Fig. 2 is a top plan view of Fig. 1.

Figs. 3 and 4 are sections on the lines 3—3 and 4—4, respectively, of Fig. 1.

Fig. 5 is a perspective view, disassembled.

Figs. 5a and 5b show modifications.

Figs. 6 to 13 inclusive are views showing several of the various cutting positions in which my cutting implement can be used, and Figs. 14 and 15 are respectively a plan and a side view partly in section showing a gang or multiple cutter embodying one of the principles of my invention.

My device comprises essentially a cutter 20, a cutter holder 21, and a combination handle and sheath 22, together with means, as the holding screw 23 and clamping nut 24 or their equivalents for locking the parts in their assembled and adjusted positions.

The cutter 20 may be any suitable blade, as for example a conventional safety razor blade having the usual clamping holes 25 or their equivalent. It may have a single cutting edge or double, triple or quadruple cutting edges.

The cutter holder 21 is a U-shaped member entirely open at its ends and along its lower edge but closed along its top edge. Its side walls are spaced apart a distance to rceive the blade, and are perforated at one or more longitudinally spaced intervals. While I have shown two perforations 26 and 27, it will be understood that I do not limit myself to this or any number of perforations. In fact, if desired the holder 21 may be longitudinally slotted substantially from end to end instead of being perforated at spaced intervals, as shown. Similarly the blade may be slotted longitudinally instead of perforated at spaced intervals, as shown.

The combination handle and sheath 22 is likewise a U-shaped member open at its ends to receive and permit adjusting movements of the blade and its holder. It is closed along a portion of its top edge, as indicated at 28 but beyond said closed portion is open as indicated at 29. It is closed along a portion of its bottom edge, as indicated at 30, but beyond said closed portion is open as at 31. The distances and/or spacing along its partly open top or bottom edges may be varied as desired according to the kind of blade and holder used and the kind of adjustments that it is desired for such blade and holder to have.

The length of the closed portion 28 may be substantially equal to the length of the open portion 31, and that of the closed portion 30 may be substantially equal to the length of the open portion 29.

The closed portion 30 is bent over far enough to provide a locking flange 30' adapted to hold the side walls of the U-shaped member 22, from springing apart, and these side walls are provided with registering longitudinally extending slots 32 within which the holding screw 23, when loosened, is slidable. The sheath may have vertical or diagonal slots as well to permit sidewise or diagonal adjustment.

In the modification of Fig. 5a, the member 22 is shown as vertically slotted as at 22a to permit the blade and its holder 21 to be adjusted and/or locked vertically as a unit relative thereto, such adjustment being held by the same screw 23 which holds the longitudinal adjustment.

This construction enables a greater extent of blade edge to be exposed as a cutting edge and hence deeper cuts to be made.

The parts are assembled by sliding the blade 20 endwise into the holder 21 until one of its holes 25 is registered with one of the holes 26 or 27 of the holder 21. Both blade and holder are then slid endwise into the sheath 22, whereupon the screw 23 is inserted transversely through the slot 32 and the registering holes of the blade and holder. The clamping nut 24 is then threaded onto the projecting end of the screw and tightened against the adjacent wall of the sheath to lock the blade and its holder at the desired adjusted position within the sheath.

When not in use, the blade is slid far enough into the sheath 22 to be completely enclosed thereby. (See Fig. 7.) If desired, one or both ends of the member 22 may be provided adjacent their open ends with pivoted guards 22' adapted to be moved into and out of blocking position with respect to the ends of the blade. (See Fig. 5b.) When the guards 22' are in blocking position they positively prevent the blade from being accidentally slid out of the member 22 a distance sufficient to expose its cutting edge (or edges). Before the blade is adjusted to cutting position, the guard or guards are swung on their pivots into non-blocking position relative to the blade.

When in use, the blade is projected into various cutting positions or angles. Such of these are illustrated in Figs. 6 to 13.

In Fig. 6, the blade is disposed at right angles to the handle, the screw 23 being shown (for purposes of illustration) in the end hold of the blade. The handle in this instance may be provided with a slot 29 of sufficient length to accommodate the blade in this position.

In Fig. 8, the screw 23 is shown as set through the forward hole 26 of the holder and the blade is projected slightly beyond the forward end of the sheath with its lower cutting edge in cutting position, the blade being disposed substantially in prolongation of the angle of the sheath. In this position, the upper edge of the blade holder reacts against the closed upper portion 28 of the sheath and the closed bottom portion 30 of the sheath acts as a guard to protect the surface S from being cut by the following portion of the exposed cutting edge of the blade. Obviously, of course, the screw 23 may be set through any of the holes in the sheath or holder or through an elongated slot in the blade, sheath or holder, if such parts are slotted instead of provided with holes.

In Fig. 9, the blade is shown as reversed end for end in its sheath, the sheath being seen from the rear or opposite side from that illustrated in Fig. 8. In Fig. 9, the screw 23 is set through the rearmost hole 27 of the holder 21, and the blade disposed at an angle to the angle of the sheath. In this position a new portion of the cutting edge is brought into action.

In Fig. 10, the screw 23 is also set through the hole 27 and the blade adjusted in a position substantially at right angles to the sheath. In this position substantially the entire length of the lower cutting edge of the blade is exposed for action.

Although not illustrated, it will be evident that the blade and sheath may be positioned at angles less or greater than right angles to each other or at any other desired angle.

In Fig. 11, the parts are in the general position of Fig. 8 but the screw 23 is set through the rearward hole 27 rather than the forward hole 26 as in Fig. 8, thus exposing a greater length of cutting edge for action.

In Fig. 12, the parts are assembled as in Fig. 9 but the blade and sheath are disposed at an acute angle to one another.

In Fig. 13, the screw 23 is disposed in the forward hole 26 but the blade and sheath are at substantially right angles to each other, the blade however being presented to the surface S at an acute angle.

These several positions suggest the many additional and possible adjustments of blade and sheath whereby new cutting edges or portions of the cutting edges may be constantly presented at effective angles to the surface S.

The sheath in itself acts as an excellent and convenient handle at any cutting adjustment or angle of the sheath with inserted blade, such handle being small, compact and easy to handle.

In Figs. 14 and 15, wherein I have illustrated a gang type of instrument using cutting units such as heretofore described, I provide a common mount for the several cutting units. This comprises a hollow member 40 and a solid member 41 telescopically adjustable in said hollow member, together with one or more handles 42 for manipulating the same. The member 40 is provided with internal screw threads for the reception of the threaded portion of the member 41 and also with external screw threads that cooperate with check nuts 44 to hold the cutting units in adjustable place as may be desired.

With the cutting units arranged as shown in Fig. 14, the telescopic mount 40—41 may be shortened or lengthened to vary the spacement of the units comprising the pair at one end of the instrument, or the units comprising the pair at the extreme ends thereof, this adjustment being held in any suitable manner, as by means of the lock nut 43 or its equivalent.

The spacing of the several units may also be varied by their independent adjustment along the members 40 and 41, the units thereafter being locked in their adjusted positions by the check nuts 44.

The handle or handles 42 may likewise be adjustable angularly with respect to the cutting edges of the blades. Also such handle or handles may be made removable if desired, as by threading them to the members 40—41.

Various other modifications in structure and arrangement may obviously be resorted to within the spirit and scope of my invention as defined by the appended claims.

What I therefore claim and desire to secure by Letters Patent is:—

1. An implement adapted to receive a cutting blade comprising a combination sheath and handle member within which a blade is adapted to be concealed when not adjusted into cutting positions, said combination member having both of its side walls substantially equal in size and shape, and means comprising openings in said combination sheath and handle member and blade, respectively, and a clamping member adjustable relative to said openings for permitting the blade to be adjustably projected out of said combination member into rectilinear and angular cutting positions relative thereto and for positively holding and locking said blade in any of its exposed cutting positions and in its concealed non-cutting position within said combination member.

2. An implement adapted to receive a cutting blade comprising a substantially U-shaped holder adapted to straddle a blade, a combination sheath and handle member within which the blade and holder are slidable as a unit so that the blade is concealed within the combination member when not adjusted into cutting positions, said combination member having both of its side walls substantially equal in size and shape, and means comprising openings in said combination sheath and handle member, holder and blade, respectively, and a clamping member adjustable relative to said openings for permitting the blade holder and inserted blade to be projected out of said combination member into rectilinear and angular cutting positions relative thereto, and for positively holding and locking said blade in any of its exposed cutting positions and in its concealed non-cutting position within said combination member.

3. A cutting implement, comprising a blade and a blade holder, a combination sheath and handle member within which said blade and blade holder are slidable, said combination sheath and handle member being open at each end and being partly closed at one end and having both of its side walls substantially equal in size and shape and partly open at an opposite edge and being longitudinally slotted, a screw adapted to be set through the slot of said combination sheath and handle member and into engagement with the blade and blade holder, and a clamping nut threaded on said screw and adapted to be tightened against said combination sheath and handle member to clamp or lock the blade and blade holder either within said member or when projected out of the same into adjusted cutting positions.

4. The implement of claim 1 and a holder for the blade within which the blade is adjustable independently of its adjustment relative to the said combination sheath and handle member.

5. A cutting implement comprising a blade, a blade holder within which the blade is adjustable, said blade holder being substantially coextensive in length with the length of the blade, and a combination sheath and handle member for both the blade holder and blade, said member having means permissive of rectilinear and angular movements of the blade whereby the blade may be adjusted to various cutting positions relative to said member, and means for positively locking the blade in any position to which it may be adjusted.

6. The implement of claim 5, the blade being adjustable within the holder independent of the adjustment of the holder relative to said combination sheath and handle member.

7. The implement of claim 5, the combination sheath and handle member having a slot or slots permissive of vertical or diagonal adjustments of the blade holder and blade.

8. A cutting implement comprising a blade, a combination sheath and handle member for said blade having a slot, means coacting with said slot permitting rectilinear or angular adjustments of said blade relative to said member, and means carried by said combination sheath and handle member at one end of the slot movable into and out of blocking relation to the rectilinear or angular movements of the blade to lock the blade within said member and to prevent exposure of its cutting edge.

9. The implement of claim 8, the blocking means being a pivoted guard.

10. A bladed cutting implement comprising a blade, a U-shaped blade holder, and a combination sheath and handle member, said blade holder being of a width to receive and straddle several blades with the cutting edge of one blade projecting beyond the cutting edge of an adjacent blade, and means permitting rectilinear or angular movements of the blade holder relative to said combination sheath and handle member.

11. A cutting implement, comprising a blade, a combination sheath and handle member within which the blade is slidable, said combination sheath and handle member being substantially U-shaped and having both of its side walls substantially equal in size and shape and open at its ends and being partially open and partially closed along its top and bottom edges, respectively, said open portions of the top and bottom edges of said member enabling the edges of the blade to project partially therethrough in variable cutting positions and said closed portions of the top and bottom edges of said member being re-active against the blade in its variable cutting positions, and means comprising openings in said combination sheath and handle member and blade, respectively, and a clamping member adjustable relative to said openings for permitting the blade to be adjustably projected out of said combination member into rectilinear and angular cutting positions relative thereto and for positively holding and locking the blade in any of its exposed cutting positions and in concealed non-cutting position within said combination member.

SAMUEL C. BRODY.